Sept. 22, 1931.  T. DAVIDSON ET AL  1,824,332
BRAKE
Filed Sept. 10, 1929  3 Sheets-Sheet 1
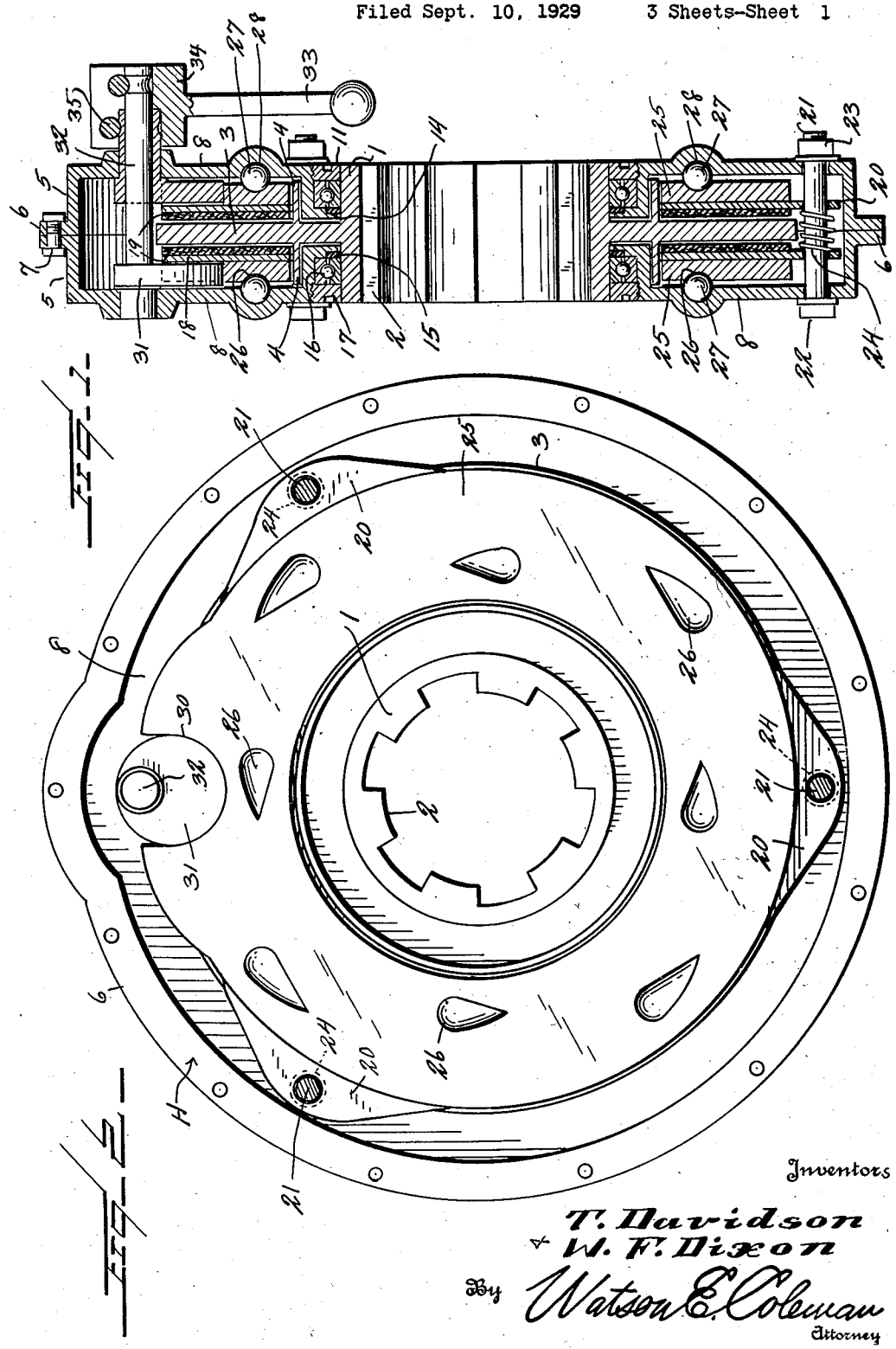
Inventors
T. Davidson
W. F. Dixon
By Watson E. Coleman
Attorney

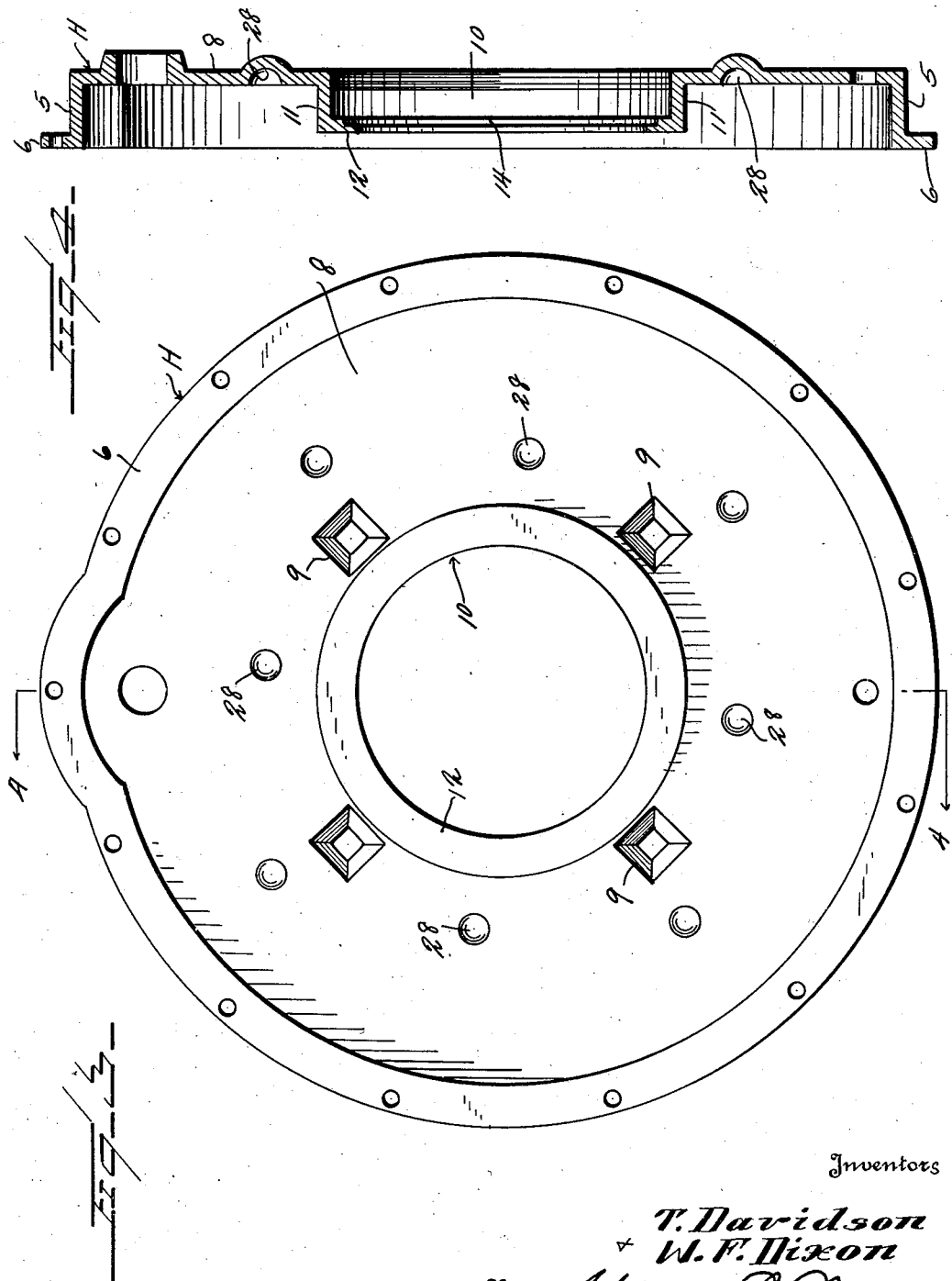

Sept. 22, 1931.  T. DAVIDSON ET AL  1,824,332
BRAKE
Filed Sept. 10, 1929   3 Sheets-Sheet 3
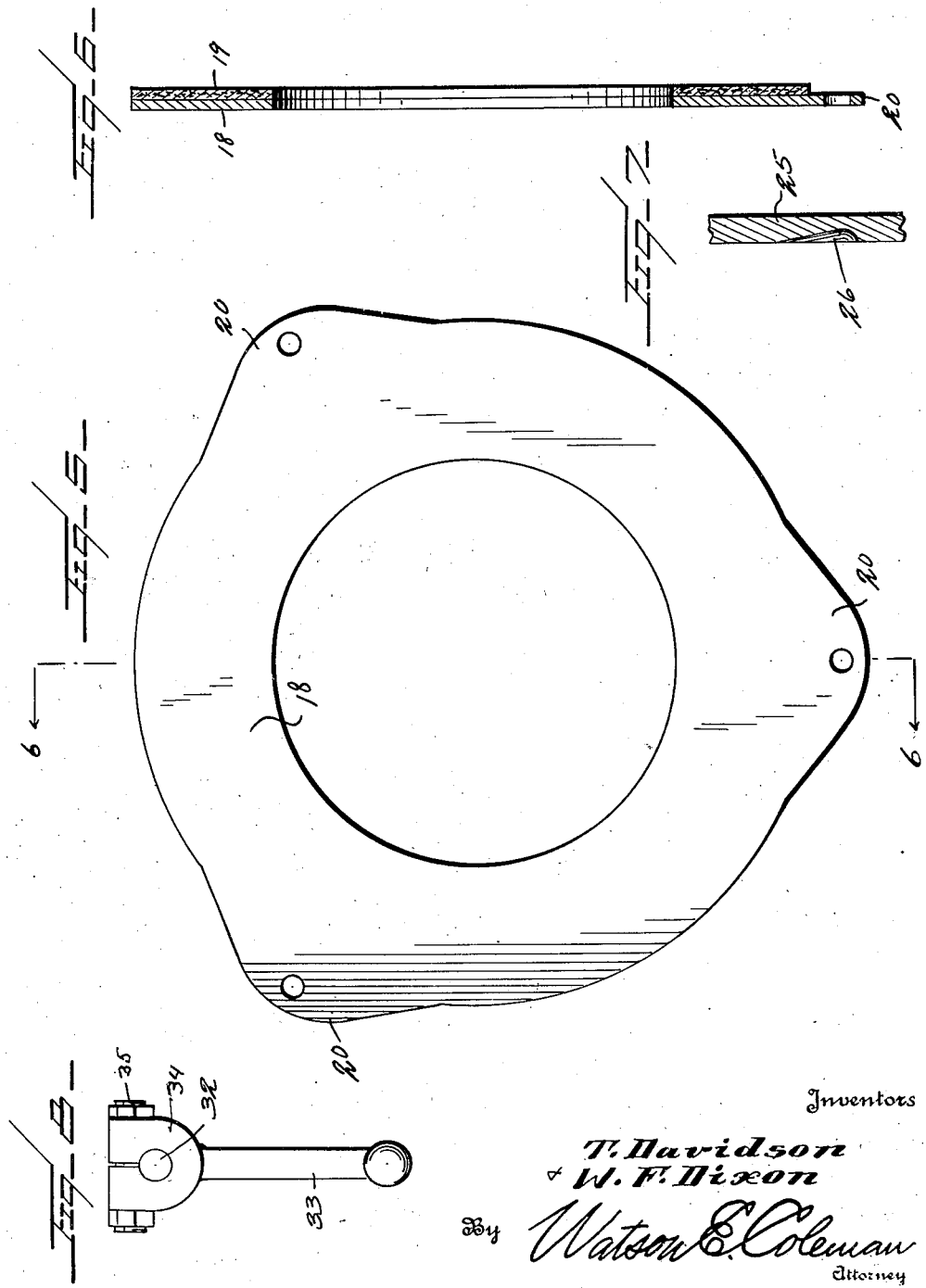
Inventors
T. Davidson
& W. F. Dixon
By Watson E. Coleman
Attorney Patented Sept. 22, 1931

1,824,332

UNITED STATES PATENT OFFICE

THOMAS DAVIDSON AND WALTER F. DIXON, OF SULLIVAN, INDIANA; SAID DIXON ASSIGNOR TO ZADA DIXON, OF SULLIVAN, INDIANA

BRAKE

Application filed September 10, 1929. Serial No. 391,654.

This invention relates to brakes, and has relation more particularly to a device of this kind adapted for use in connection with automobiles and other mechanical appliances, and it is an object of the invention to provide a brake of this kind embodying an assembly wherein the operating elements of the brake are simply and accurately adjusted giving more brake power than present type brakes and equal pressure at all points as well as being dust and waterproof and free from grease.

Another object of the invention is to provide a device of this kind embodying a rotary disk having coacting therewith braking elements movable toward or from the disk and adapted to have frictional engagement therewith.

The invention consists in the details of construction and in the combination and arrangement of the several parts of our improved brake whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a sectional view taken through a brake constructed in accordance with an embodiment of our invention with certain of the parts in elevation;

Figure 2 is a view in side elevation of the structure as illustrated in Figure 1 with one of the sections of the housing removed;

Figure 3 is a view in elevation of the end face of a housing section;

Figure 4 is a sectional view taken substantially on the line 4—4 of Figure 3;

Figure 5 is a view in elevation of one of the movable brake disks to which the brake lining is attached;

Figure 6 is a sectional view taken substantially on the line 6—6 of Figure 5;

Figure 7 is an enlarged fragmentary sectional view taken through one of the brake disks illustrating one of the ball races;

Figure 8 is an elevational view of the lever arm for operating the cam shaft for effecting the desired application of the brake.

As disclosed in the accompanying drawings, 1 denotes a hub of requisite dimensions having its inner periphery provided with the longitudinally disposed teeth 2 whereby the hub 1 may be effectively interlocked or keyed to the wheel of the vehicle. Midway its ends, the hub 1 is surrounded by an outstanding, continuous annular plate or disk 3 integral with the hub 1, which has its opposite faces flat. The disk or plate 3 in relatively close proximity to the hub 1 carries the oppositely disposed and laterally directed flanges 4. These flanges 4 are substantially at right angles to the plate or disk 3 and in the present embodiment of our invention terminate inwardly of the ends of the hub 1 proper.

The plate or disk 3 extends within a housing H comprising two substantially duplicate sections, the peripheral walls 5 of which being defined by outstanding flanges 6. In the assembly of the housing, these flanges 6 abut and have disposed therethrough at circumferentially spaced points the holding bolts 7. One of the sections of the housing H, as illustrated in Figure 3, differs from the other in that it is provided in its side wall 8 and in relatively close proximity to its center with a plurality of countersunk openings 9 whereby said section of the housing may be fixedly anchored to the front spindle or rear axle housing of an automobile or kindred vehicle or any other appliance with which the brake may be employed. Each of the sections of the housing H is provided with a central opening 10 defined by an inwardly disposed flange 11.

This flange 11 has its inner free end terminating inwardly of the inner open face of the housing section and said inner end of the flange 11 is defined by an inwardly directed flange 12 which closely approaches the periphery of the hub 1 in the complete assembly. In the assembly of the brake, a flange 4 surrounds the flange 11 immediately adjacent thereto.

The inner marginal portion of the flange 12 is provided therearound with a rabbet 14 to provide a seat for a gasket 15 having close contact with the periphery of the hub 1 and which serves to provide effective means to prevent grease from getting inside of the housing assembly. When the housing assembly is in applied position with respect to the hub 1, anti-friction means, as indicated at 16, are interposed between the flanges 11 of the section of the housing H and the periphery of the hub 1, said anti-friction means being maintained in desired position by the annular members 17 closely surrounding the hub 1 outwardly of the said anti-friction means and in threaded engagement within the openings 10 of the housing sections. It is believed to be obvious that the assembly of the housing H with respect to the disk or member 3 and the hub 1 is such that the hub 1 and member or disk 3 is free to rotate with respect to the housing H with a minimum of frictional resistance.

Freely mounted upon the bolts 21 and at opposite sides of the outer portion of the disk or member 3 are the annular members or disks 18, the inner faces of which being provided with brake linings 19 adapted to have direct frictional contact with the disk or member 3.

At predetermined points therearound, the peripheries of the disks 1 are provided with the outstanding lugs 20, the lugs of one disk being in alignment with the lugs of the second disk. These lugs 20 have freely disposed therethrough the shanks or bolts 21 which are also directed through the side walls 8 of the sections of the housing H. Each of these bolts or shanks 21 has a head 22 contacting with the outer face of a side plate of one housing section and a retaining nut 23 coacting with the side face 8 of a second housing section.

Surrounding each of the shanks 21 and interposed between the lugs 20 is an expansible member or coil spring 24 of sufficient tension to constantly urge the disks 18 in a direction away from the member or disk 3. Each of the springs 24 also serves to constantly maintain the disks 18 in contact with the inner faces of the annular members 25 freely surrounding the flanges 4. The outer face of each of these annular members 25 is provided therearound with a series of cam ball races or pockets 26, in each of which is received a ball 27 which is also seated in a parti-spherical pocket or recess 28 provided in the inner face of the adjacent end wall 8 of the housing section. These pockets 28 maintain the balls 27 in fixed positions while the cam races or pockets 26, upon rotation of the annular members 25, cause the disks 18 to have inward movement toward the member or disk 3 so that the linings 19 may have the desired frictional contact with said disk or member 3 to effect the desired braking action.

In the present embodiment of our invention, the peripheral portions of the members 25 are provided with the aligned open recesses 30 substantially semi-circular in form, and in each of which is snugly engaged a disk 31. Both of the disks 31 are eccentrically mounted upon the shaft 32 for unitary movement therewith. This shaft 32 is supported by the housing H and is disposed transversely thereof. One end portion of the shaft 32 is extended and to said extended portion is fixed an operating lever 33 adapted to be operatively connected with a pedal, lever or the like. Upon requisi e swinging movement of the lever 33, with the resultant rocking of the shaft 32, the eccentric disks 31 will impart desired movement to the members 25 to effect the desired braking action or to release the same.

The shaft 32 for one of the disks 31 is tubular and through which the shaft 32 for the second disk 31 is directed. The lever 33 is provided with a split hub 34 which is clamped to the extended portions of the shafts 32 by the bolts 35 each of which having direct coaction with a shaft 32. By adjusting the hub 34 with respect to the shafts 32, or by rotatively adjusting one of the shafts 32 with respect to the other, desired adjustment of the brake proper may be readily and conveniently attained.

The housing H is provided with an opening for a feeler gauge used in making brake adjustments.

From the foregoing description it is thought to be obvious that a brake constructed in accordance with our invention is particularly well adapted for use by reason of the convenience and facility wi h which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown carrying out our invention in practice except as hereinafter claimed.

We claim:—

1. In combination with two members, one being rotatable with respect to the other, a braking device comprising a disk mounted to rotate with one of the members, a housing fixed to the second member and to which said disk extends, braking elements within the housing at opposite sides of the disk and movable toward and from the disk, and means interposed between the housing and the braking elements for moving said braking disks into engagement with the first named disks, said means including a ring-shaped plate frictionally engaging said braking elements and having a plurality of tapering recesses in one face thereof and mounted for free rotation with respect to the housing and braking elements, and spherical means engaging the housing and said plate whereby to limit the rotation of said plate, said spherical means forcing the plate inwardly upon rotation of the plate in one direction.

2. In combination with two members, one being rotatable with respect to the other, a braking device comprising a disk mounted to rotate with one of the members, a housing fixed to the second member and to which said disk extends, braking elements within the housing at opposite sides of the disk and movable toward and from the disk, means interposed between the housing and the braking elements for moving said braking disks into engagement with the first named disks, said means including a ring-shaped plate frictionally engaging said braking elements and having a plurality of tapering recesses in one face thereof and mounted for free rotation with respect to the housing and braking elements, and spherical means engaging the housing and said plate whereby to limit the rotation of said plate, said spherical means forcing the plate inwardly upon rotation of the plate in one direction and means for constantly urging the braking disks away from the first named disks.

3. In combination with two members, one being rotatable with respect to the other, a braking device comprising a disk mounted to rotate with one of the members, a housing fixed to the second member and to which said disk extends, braking elements within the housing at opposite sides of the disk and movable toward and from the disk, means interposed between the housing and the braking elements for moving said braking disks into engagement with the first named disks, said means including a ring-shaped plate frictionally engaging said braking elements and having a plurality of tapering recesses in one face thereof and mounted for free rotation with respect to the housing and braking elements, and spherical means engaging the housing and said plate whereby to limit the rotation of said plate, said spherical means forcing the plate inwardly upon rotation of the plate in one direction said first named disk being provided with a hub, the housing surrounding said hub and closely approaching the same, and anti-friction means interposed between the hub and housing.

In testimony whereof we hereunto affix our signatures.

THOMAS DAVIDSON.
WALTER F. DIXON.